United States Patent Office 2,941,883
Patented June 21, 1960

2,941,883

ALLOY ESPECIALLY SUITED TO CLADDING NUCLEAR FUEL ELEMENTS

Noble N. Ida, Towson, and John J. Mueller, Dundalk, Md., assignors to The Martin Company, a corporation of Maryland No Drawing. Filed Oct. 2, 1957, Ser. No. 687,606

4 Claims. (Cl. 75—124)

This invention relates to a novel alloy composition which is especially suited for cladding fuel elements which are used in nuclear reactors.

Uranium dioxide and other nuclear fuel element materials by themselves lack sufficient structural strength to be used in the form of rods or the like in nuclear reactors. Powdered aluminum, stainless steel or other similar materials are often combined with uranium dioxide and other nuclear fuel element materials to facilitate shaping them into desired forms and to add structural strength, but further support is necessary. Also, a barrier is required around the nuclear fuel element core materials at all times to protect the core against corrosion, against erosion and abrasion and against the loss of fission fragments. To satisfy these requirements fuel elements are often clad with a material having suitable mechanical and chemical properties. However, the known cladding materials are not entirely satisfactory in service and consequently, a search was made for a better clad, keeping in mind that such a material must have both structural strength, corrosion resistance and a low thermal neutron absorption cross-section. Materials having a high neutron absorption cross-section are not useful because they lower the efficiency of the fuel element. In addition, the cladding material must have high strength at elevated temperatures and possess sufficient ductility to be formable at reasonable working temperatures. The present invention is concerned with such an alloy.

An object of this invention is to provide a novel alloy composition which is especially suitable for cladding fuel elements to be used in nuclear reactors.

Other objects and advantages of this invention will become apparent from the following description and explanation thereof.

In accordance with this invention, the alloy to be used for cladding of fuel elements consists essentially of about 3 to 6% weight percent (i.e. w/o) chromium, about 0.2 to 1 w/o titanium, about 4 to 11 w/o aluminum, about 0.5 to 4 w/o niobium, not more than about 0.15 w/o carbon, and the balance iron.

More particularly, the above alloy may contain up to about 3 w/o molybdenum and up to about 4.5 w/o silicon.

In a more particular aspect of this invention, an article of manufacture is proposed which consists essentially of a nuclear fuel element which has the outer surface thereof clad with the alloy mentioned above. The cladding material of this invention is of relatively low thermal neutron absorption cross-section and for that reason it is especially suited for use in nuclear reactors.

In the initial stages of finding a material having the desired corrosion resistance, strength, ductility, formability and low neutron absorbing cross-section to clad fuel elements, various alloys were tried but unfortunately it was found that while they possessed one or two of these desired properties, they did not possess all of them. On the other hand, some alloys had a suitable neutron absorption cross-section but did not possess satisfactory mechanical or chemical properties. Among the various alloys which were tried, the aluminum-iron alloys showed promise, because aluminum has the property of imparting to the alloy a low thermal neutron absorption cross-section and high corrosion resistance. However, when the quantity of aluminum is increased to a certain level in the alloy, the mechanical properties and fabricability are undesirably changed and for this reason it was at first thought that an aluminum containing alloy was not of practical importance. Later it was found that small amounts of niobium alloyed with chromium, aluminum and iron, resulted in an alloy having excellent mechanical properties and low thermal neutron absorption cross-section. The niobium serves to help maintain a single phase, that is, the alpha phase, in the alloy. Further, it was noted that the corrosion resistance of the alloy was increased by the presence of niobium as well as the strength of the alloy at high temperatures. It is apparent that the addition of niobium effects an unusual and unexpected cooperation with the other alloying ingredients.

Titanium may also be added to the alloy in order to stabilize any carbon that may be present. Niobium, in combination with titanium, cooperates to an unusual extent in minimizing any adverse effects from carbon, and further, these elements jointly give a greater resistance to corrosion than can be expected from the individual effects of each element. Titanium is added to the alloy in an amount of about 0.20 to 1% by weight based on the total composition. Excellent results are obtained by the use of 0.5 w/o of titanium. Silicon and molybdenum can also be added to the alloy in order to enhance its mechanical properties. Molybdenum is added in an amount of about 0.5 to 3 w/o based on the total weight of the composition. Silicon, in addition to enhancing the mechanical properties, serves to reduce the tendency of the alloy to creep or scale at high temperature. Silicon is added in an amount of about 0.1 to 4.5 w/o, based on the total weight of the composition. Titanium, silicon and molybdenum are optional alloy ingredients and are used only when it is desired to obtain further improvements in certain properties of the alloy.

This alloy can be manufactured by blending the desired percentages of the above ingredients while in solid form, vacuum or air melting the resultant alloy, casting the melt into the desired shape, employing standard melting and casting procedures. This cast alloy can then be rolled and cut to form in the desired clad thicknesses and shapes desired.

It was found that the concentration of aluminum should be carefully controlled in order to produce an alloy having the desired low thermal neutron absorption cross-section while also having desired mechanical properties. It was found, after careful experimentation, that the aluminum content of the alloy is most effective at about 4 to 11% by weight, based on the total composition. At this concentration of aluminum, niobium is controlled within the range of 0.5 to 4% by weight based on the total composition. Similarly, the chromium content of the alloy is maintained at about 3 to 6% by weight. A higher concentration of chromium is not desired because it undesirably increases the neutron absorption cross-section of the alloy while imparting little added improvements in the alloy properties. It is believed that a higher concentration of chromium inhibits the formation of the iron-aluminum super lattice with attendant poor mechanical properties such as lower ductility and fabricability. The balance of the alloy is iron. However, it is also important to maintain the carbon at a level not greater than 0.15% by weight. Higher concentrations of carbon have an adverse effect on the mechanical properties of the alloy. It is apparent that the concentrations of the alloying ingredients are controlled to provide an alloy having low thermal neutron absorption cross-section, excellent ductility, low corrosion susceptibility at elevated temperatures, high strength at elevated temperatures and excellent bonding properties for adherence to the fuel core. In respect to the bonding properties of the alloy of this invention, by methods used in fuel element fabrication, it was found that it is comparable to stainless steel. At present it is known that stainless steel possesses excellent mechanical properties for use in cladding fuel elements but it has an undesirably high thermal neutron absorption cross-section and is a source of difficulty in reprocessing spent fuel elements by chemical dissolution techniques.

In order to evaluate the alloy of the present invention, a comparison was made with other alloys that might be used as cladding materials. The alloys used in this comparison are described below, the alloy of the present invention being "Example 1."

*Example 1.*—An alloy containing 6% chromium, 8% aluminum, 2% niobium, 0.5% titanium, and the balance iron.

*Example 2.*—16% aluminum, 3.3% molybdenum, and the balance iron.

*Example 3.*—Nickel-chromium, 18–8 stainless steel.

In Table I below, the mechanical properties at room temperature and an elevated temperature are given for Examples 1 and 2.

TABLE I

| Material | Room Temperature | | | | Elevated Temperature | | |
|---|---|---|---|---|---|---|---|
| | Condition | Yield Str., p.s.i. | Ult. Str., p.s.i. | Elongation, inches | Temp., ° F. | Yield Str., p.s.i. | Ult. Str., p.s.i. |
| Ex. #1 | Annealed | 72,000 | 92,000 | 14.0 | 1,500 | 4,480 | 10,870 |
| Ex. #2 | Annealed | 51,200 | 53,800 | 1.5 | | | |

It can be seen from Table I that the alloy of this invention, i.e., Example 1, is a great deal more ductile than the alloy containing a high content of aluminum. Furthermore, the strength of the alloy of this invention compares favorably with that of Example 2.

The thermal neutron absorption cross-section of Example 1 was compared with that of Example 3. As previously indicated, stainless steel possesses excellent mechanical properties but the material has an undesirable neutron absorption cross-section. Table II below illustrates this point.

TABLE II

| Material | Macroscopic Thermal Neutron Capture Cross-section | Relative Cross-Section, Ex. No. 3=100 |
|---|---|---|
| Ex. No. 1 | 0.168 | 69 |
| Ex. No. 3 | 0.250 | 100 |

The fabricability of Examples 1 and 2 were compared and the results of this comparison are given in Table III below.

TABLE III
*Fabricability*

| Material | Tensile Test (R.T.), Elongation, percent | Minimum Bend Radius, in. | Machineability | Hot-Bonding | Formability |
|---|---|---|---|---|---|
| Ex. No. 1 | 14.0 | 1 T | Good | Excellent | Fair |
| Ex. No. 2 | 1.0 | 24 T | Poor | Poor | Poor |

It can be seen from Tables I, II and III above that the alloy of this invention has excellent mechanical and excellent thermal neutron absorption cross-section properties. This new alloy actually possesses the desirable mechanical properties of stainless steel and the desirable low thermal neutron absorption cross-section of high aluminum containing alloys.

The alloy of the present invention also has excellent corrosion resistance properties in the presence of air, water, nitrogen or carbon dioxide at high temperatures. This resistance is better than that of any of the other alloys set forth in the above examples and is generally better than that of stainless steel or aluminum.

In commercial practice, the clad fuel element is used for a period of about 18 months. The clad has a thickness of about 0.005 to about 0.030 inch. It has been found that fuel elements clad with the alloy of this invention can be reprocessed much easier than fuel elements containing stainless steel as the cladding material. This is an important advantage from a commercial standpoint.

The alloy of this invention can also be used to clad other elements of a nuclear reactor such as the control rods, etc., and it is contemplated that it can be used in numerous other applications where its unique characteristics are desired.

Having thus provided a written description of our invention along with specific examples thereof, it should be understood that no undue restrictions or limitations are to be imposed by reason thereof, but that the present invention is defined by the appended claims.

We claim:

1. An alloy consisting by weight essentially of about 3 to 6% chromium, about 4 to 11% aluminum, about 0.5 to 4% niobium, not more than about 0.15% carbon, between about 0.2 and 1% titanium, up to about 4.5% silicon, up to about 3% molybdenum and the balance iron.

2. An alloy consisting by weight essentially of about 5 to 6% chromium, about 6 to 10.5% aluminum, about 0.5 to 2% molybdenum, about 1 to 2% niobium, about 0.5% titanium, about 0.5 to 4.5% silicon, not more than 0.15% carbon and the balance iron.

3. An alloy consisting by weight of about 3% to 6% chromium, about 4% to 11% aluminum, about 0.5% to 4% niobium, not more than about 0.15% carbon, about 0.2% to 1% titanium, balance iron.

4. An alloy consisting by weight of about 3% to 6% chromium, about 4% to 11% aluminum, about 0.5% to 4% niobium, not more than about 0.15% carbon, about 0.2% to 1% titanium, at least one material selected from the group consisting of silicon and molybdenum, said silicon and molybdenum being present in said alloy in amounts not greater than about 4.5% and 3%, respectively, balance iron.

References Cited in the file of this patent

UNITED STATES PATENTS

| | | |
|---|---|---|
| 2,387,980 | Cooper | Oct. 30, 1945 |
| 2,797,161 | Ireland et al. | June 25, 1957 |
| 2,797,162 | Korczynsky | June 25, 1957 |
| 2,798,848 | Kingdon | July 9, 1957 |
| 2,799,642 | Hurwitz et al. | July 11, 1957 |
| 2,849,387 | Brugmann | Aug. 26, 1958 |